Patented Aug. 16, 1932                                                1,871,991

UNITED STATES PATENT OFFICE

WINFRID HENTRICH, OF WIESDORF-ON-THE-RHINE, AND RUDOLF KNOCHE, OF LEVER-KUSEN-ON-THE-RHINE, GERMANY, ASSIGNORS TO GENERAL ANILINE WORKS, INC., OF NEW YORK, N. Y., A CORPORATION OF DELAWARE

NEW AZO DYESTUFFS

No Drawing. Application filed February 29, 1928, Serial No. 258,142, and in Germany March 12, 1927.

The present invention relates to new azo dyestuffs of the general formula:

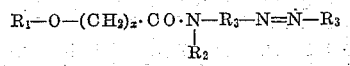

wherein $R_1$ stands for an aromatic nucleus of the benzene or naphthalene series, which may be substituted by halogen, a nitro or alkyl-group, $R_2$ stands for hydrogen which may be replaced by alkyl, one $R_3$ stands for the residue of a coupling component capable of producing an azodyestuff, and the other $R_3$ stands for the residue of a diazotization component capable of producing an azodyestuff which may contain a further $-N=N-$ aryl residue and $x$ stands for one of the numbers one, two and three.

According to our invention the new dyestuffs may be prepared by causing a compound of the general formula:

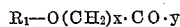

wherein $R_1$ and $x$ have the above indicated meaning and $y$ stands for a halogen atom, to react upon a compound of the general formula:

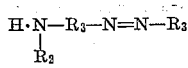

wherein $R_2$ and $R_3$ have the above indicated meaning, in the presence of an acid-binding agent e. g. sodium carbonate.

Otherwise our dyestuffs may be prepared by causing any diazocompound to react upon any coupling component containing linked to a nitrogen atom the group

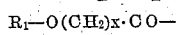

wherein $R_1$ and $x$ have the above indicated meaning or by causing any diazocompound containing the same group $R_1-O-(CH_2)_x-CO-$ linked to a nitrogen atom to react upon any coupling component.

Our new dyestuffs are various colored powders, soluble in water if they contain a sulfonic acid or carboxylic acid group. In an acid bath they dye wool evenly various shades of good fastness to light and fulling. They are also suitable for discharge printing on wool and for the production of valuable lakes or pigments.

The following examples will illustrate our invention without limiting it thereto:—

*Example 1.*—93 parts by weight of aniline are diazotized and coupled with 497 parts by weight of the sodium salt of the 1-phenoxy - acetylamino -8- hydroxynaphthalene - 3.6-disulfonic acid in solution rendered alkaline with sodium carbonate.

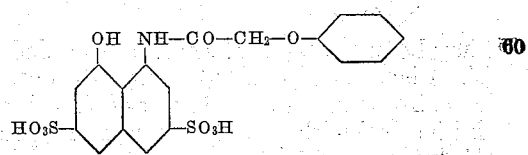

the dyestuff is isolated by working up the reaction mixture in the customary manner. It dyes wool evenly very clear pink shades of very good fastness to light and washing.

Instead of aniline other diazo compounds can be used as desired, for example 2-aminobenzoic acid, 2-acet-amino-5-aminoanisol, 4-aminoacetanilide or para-xylidine, when different shades are obtained, while the dyestuffs possess similar properties. Likewise the phenoxyacetyl residue can be replaced by similar residues, for example, by the 2- (or 4-)-chloro-phenoxyacetyl-, the 3-(or 4-)-nitrophenoxy-acetyl-, the 2-chloro-4-methylphenoxy-β-propionyl:

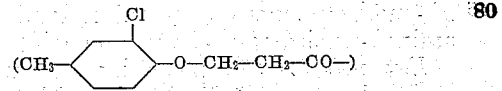

or the 1-(or 2-)-naphthoxyacetyl residue. Furthermore the 1-amino-8-hydroxynaphthalene-3.6-disulfonic acid can be replaced by other aminoaphtholsulfonic acids, such for example as, the 1-ethylamino-8-hydroxynaphthalene-3.6-disulfonic acid and the like.

The dyestuff aniline-azo-1-(4'-chlorophenoxyacetyl-amino - 8 - hydroxynaphthalene - 4.6-disulfonic acid dyes wool a powerful yellowish red shade.

When a slight excess above one mol. of phenoxyacetylchloride is caused to act at about 30–40° C. in the presence of an agent combining with acid on the monoazo dyestuff derived from one mol. of diazobenzene and one mol. of 1-amino-8-hydroxynaphthalene-3.6-disulfonic acid (coupled in alkaline solution), the same dyestuff is obtained as described at the beginning of this example.

*Example 2.*—750 parts by weight of the sodium salt of the monoazo dyestuff, obtainable by coupling in acid solution the diazo compound of one mol. of the 4-nitro-1-aminobenzene-2-sulfonic acid with one mol. of the 2-(ω-aminoethyl-amino)-naphthalene-7-sulfonic acid, are dissolved in 50 litres of water and 600 parts by weight of 2-chloro-phenoxyacetyl chloride are added slowly drop by drop at about 38–40° C., while stirring well. In order to complete the reaction the mixture is heated for a short time to 50° C., the new product is salted out with a little common salt, pressed and dried.

Obviously the 2-(ω-2'-chlorophenoxyacetylamino-ethylamino)-naphthalene-7-sulfonic acid of the formula:

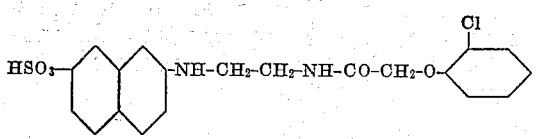

may be produced first and then coupled with the diazo compound of 4-nitro-1-aminobenzene-2-sulfonic acid. The resulting dyestuff is identical with that of the preceding process. It dyes wool evenly a very clear reddish violet. The dyeing is particularly fast to light, fulling and perspiration.

As in Example 1 the diazo components, the coupling components and also the aryloxyacyl residues may be varied very widely. Thus, for example, the dyestuff obtainable from the diazo compound of 4.6-dinitro-1-aminobenzene-2-sulfonic acid by coupling with the 2-(ω-4'-methylphenoxyacetylaminoethylamino-)-naphthalene-6-sulfonic acid gives on wool a pure reddish blue, possessing the fastness properties described above. A quite similar dyestuff is produced from the diazo compound of the 4.6-dinitro-1-aminobenzene-2-sulfonic acid and the 2(ω-5'-chloro-2'-methylphenoxy-β-propionylaminoethylamino)-naphthalene-7-sulfonic acid.

*Example 3.*—385 parts by weight of 1-amino benzene-2.5-disulfonic acid-azo-paraxylidine are diazotized in the customary manner and coupled with 531 parts by weight of the disodium salt of 1-(4'-chlorophenoxyacetylamino-)-8-hydroxynaphthalene-4.6-disulfonic acid in solution rendered alkaline with sodium carbonate.

The dyestuff is isolated by working up the reaction mixture as customary; when it is used as a lake-dye or pigment a particularly clear violet is obtained. The dyestuff very easily can be precipitated and is fast to light and water.

Other substituted amino- or aminoazo-compounds of the benzene or naphthalene series can be used as diazo components as desired. For example, the dyestuff obtainable from the diazo compound of the 4-chloro-2-anisidine and the 1-(4'-chlorophenoxyacetylamino)-8-hydroxynaphthalene-4.6-disulfonic acid is a bluish red.

*Example 4.*—242 parts by weight of 4-amino-1-phenoxy-acetylamino-benzene are dissolved in hot water and filtered while stirring on to ice. The solution is acidified with hydrochloric acid, diazotized and coupled with 254 parts by weight of 1-(4'-sulfo-)-phenyl-3-methyl-5-pyrazolone in solution rendered alkaline with sodium carbonate. The dyestuff is isolated by working up the reaction mixture in the customary manner and is obtained in a very good yield; it dyes wool evenly clear, golden yellow shades of remarkable fastness to light and fulling.

The phenoxyacetyl residue in the 1.4-phenylene-diamine can be replaced by similar residues, for example, by the 2-(or 4-)-chlorophenoxyacetyl-, the 2-(or 4-)-nitro phenoxyacetyl-, the β-(2-methylphenoxy-)-propionyl, or the 1-(or 2-)-napthoxyacetyl residues. Likewise homologues or substitution products of the phenoxy-acetylated 1.4-phenylene-diamine can be used as diazo components, for example 2-amino-4-phenoxyacetylamino-1-methoxybenzene

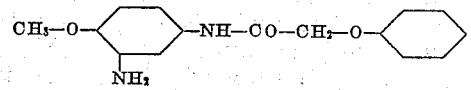

or 4-amino-2-N-methyl-N-phenoxyacetylamino-1-methylbenzene

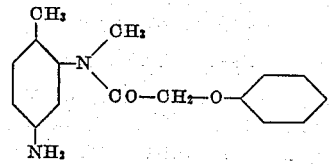

or also 4-amino-1-N-ethyl-N-phenoxyacetylaminobenzene,

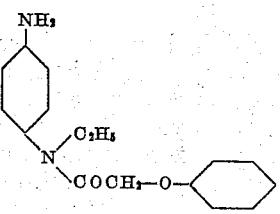

the diazo compounds of which, for example, by coupling in alkaline solution with 2-methylamino-8-hydroxynaphthalene-6-sulfonic acid yields a very even brown, fast to fulling and light.

Other pyrazolones, methylketol and its sulfonic acid can be used as coupling components, as well as any desired aminonaphthol sulfonic acids and the N-alkyl or acidyl substitution products thereof.

The dyestuff described in this example is likewise obtainable by introducing the phenoxy acetyl residue after the production of the dyestuff. This can be effected in about the following manner:

372 parts by weight of the aminoazo compound obtainable for example by the partial reduction of the monoazo dyestuff from 4-nitraniline and 1-(4′-sulfo)-phenyl-3-methyl-5-pyrazolone are treated with 250 parts by weight of phenoxyacetyl chloride in aqueous solution at 40° C. with thorough stirring, the reaction mixture being maintained weakly alkaline by careful dropping in of a 10% sodium carbonate solution. The reaction is complete, when a test portion no longer reacts with nitrous acid. The product is salted out and worked up in the customary manner.

*Example 5.*—242 parts by weight of 4-amino-1-phenoxyacetylaminobenzene are diazotized as in Example 4 and coupled with 304

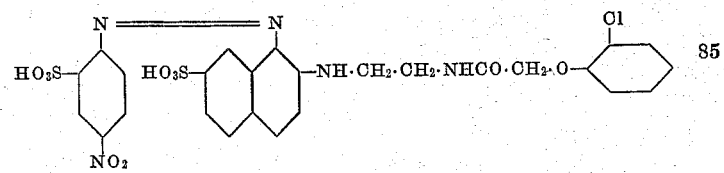

parts by weight of 1-napthol-3.6-disulfonic acid in a solution rendered alkaline by means of sodium carbonate. The dyestuff is isolated by working up the reaction mixture in the customary manner; it gives on wool clear, yellowish red even shades of very satisfactory fastness to fulling and light.

An orange of similar properties is obtained from the diazo compound of the 2-(N-phenoxyacetylamino - N-ethyl)-1-aminobenzene

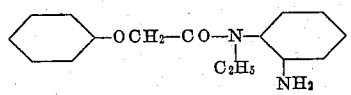

by coupling with 2-naphthol-6.8-disulfonic acid.

Valuable monoazo dyestuffs can also be obtained by using as diazo components compounds such as the 4-amino-(phenoxy-acetanilide)-3- sulfonic acid.

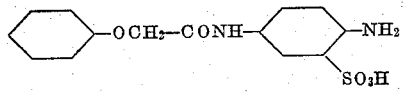

or the 4-amino-(2′-napthoxyacetanilide)-3-sulfonic acid or also the 3.5-dichloro-4-amino-(β-phenoxy-propionyl-anilide).

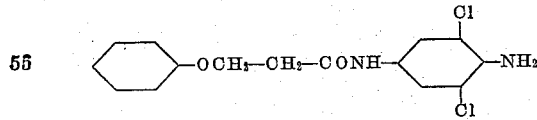

We claim:

1. As new products azodyestuffs of the general formula:

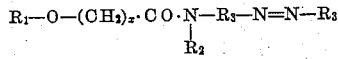

wherein $R_1$ stands for an aromatic nucleus of the benzene or naphthalene series which may be substituted by halogen, alkyl or alkoxy, $R_2$ stands for hydrogen which may be replaced by alkyl, $x$ stands for one of the numbers one, two and three, one $R_3$ stands for the residue of a coupling component capable of producing an azodyestuff, the other $R_3$ stands for the residue of a diazotization component capable of producing an azodyestuff, said dyestuffs being various colored powders, easily soluble in water if they contain an acid group, dyeing wool in an acid bath evenly various shades of good fastness to light and fulling and being suitable for discharge printing on wool and the production of valuable lakes or pigments.

2. As a new product the azo dyestuff having in its free state the probable formula:

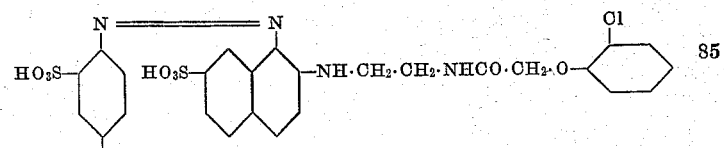

being a dark powder easily soluble in water, dyeing wool evenly clear reddish violet shades of good fastness to light, fulling and perspiration.

3. As new products azo dyestuffs of the general formula

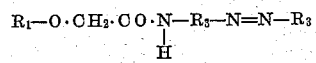

wherein $R_1$ stands for a benzene nucleus which may be substituted by halogen, alkyl or alkoxy, one $R_3$ stands for the residue of a coupling component capable of producing an azodyestuff, the other $R_3$ stands for the residue of a diazotization component capable of producing an azodyestuff, said dyestuffs being colored powders, easily soluble in water if they contain an acid group, dyeing wool in an acid bath evenly various shades of good fastness to light and fulling and being suitable for discharge printing on wool and the production of valuable lakes or pigments.

In testimony whereof we have hereunto set our hands.

WINFRID HENTRICH.
RUDOLF KNOCHE.